United States Patent [19]

Rogers

[11] 3,967,897
[45] July 6, 1976

[54] APPARATUS AND METHOD FOR EVALUATING COLOR NEGATIVES

[76] Inventor: Winston L. Rogers, P.O. Box 206, Rheem Valley, Calif. 94570

[22] Filed: Oct. 4, 1974

[21] Appl. No.: 512,077

[52] U.S. Cl. .................................... 355/32; 355/46; 355/77
[51] Int. Cl.² ................ G03B 27/32; G03B 27/52; G03B 27/44
[58] Field of Search .......................... 355/32, 46, 77

[56] References Cited
UNITED STATES PATENTS
3,532,038  10/1970  Rottmann ......................... 355/46 X
3,748,045   7/1973  Mitchell ........................... 355/32 X Primary Examiner—Richard A. Wintercorn
Attorney, Agent, or Firm—Bruce & McCoy

[57] ABSTRACT

An apparatus for color negative evaluation for use with a photo enlarger comprised of a filter and lens matrix board, and a frame for supporting the filter matrix and lens boards intermediate the photo enlarger holding the color negative being evaluated and a sheet of photosensitive paper whereby a plurality of images having colorations which depend on the individual filter elements are produced on the photosensitive paper. Further, a method comprised of the steps of exposing a color negative through a set of filter matrix boards having successively finer gradations such that an ultimate filter combination can be determined for making a final color balanced print.

7 Claims, 4 Drawing Figures

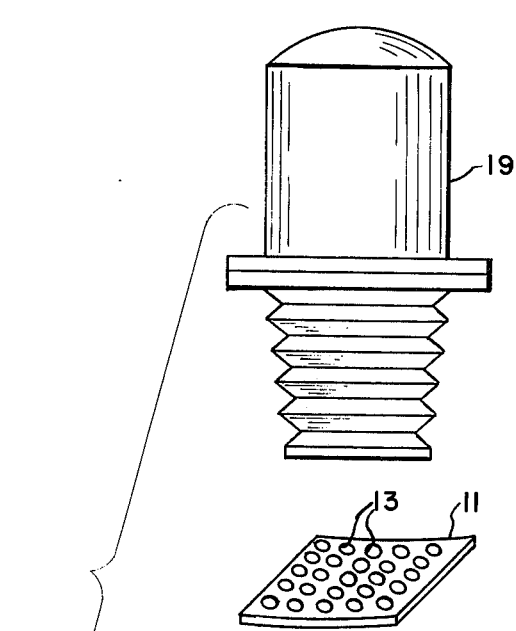
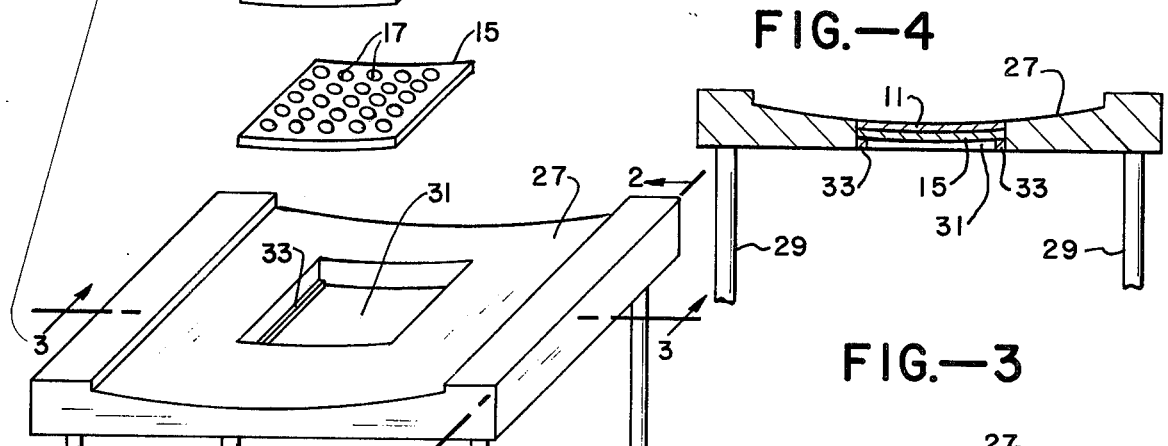
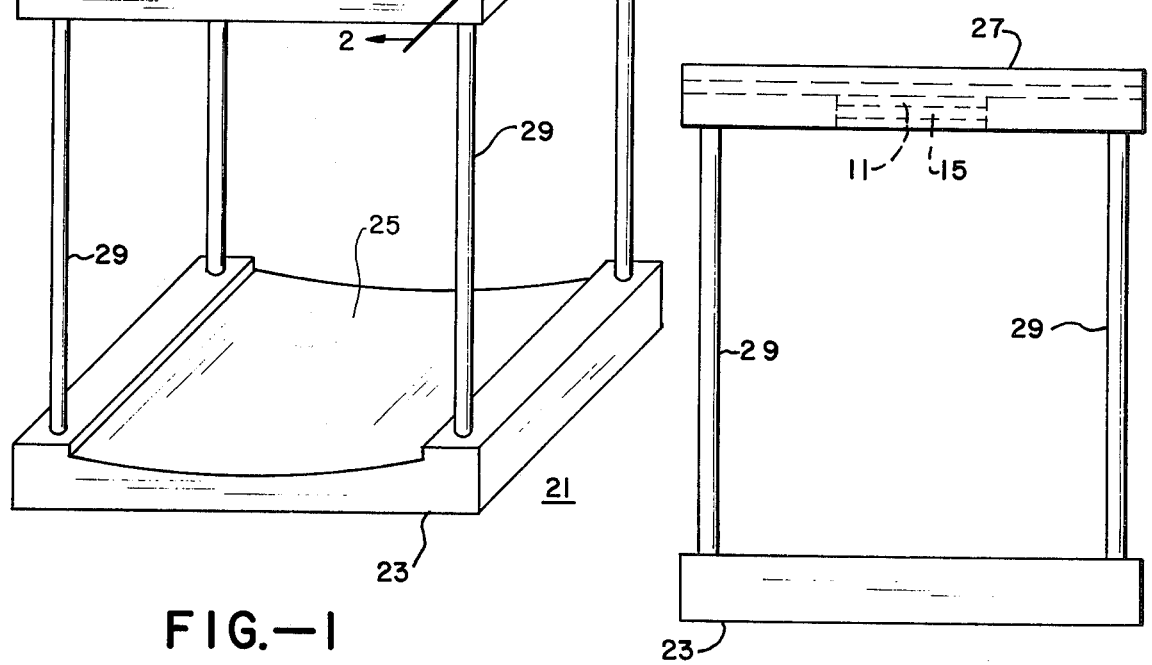

APPARATUS AND METHOD FOR EVALUATING COLOR NEGATIVES

BACKGROUND OF THE INVENTION

1. Field of the Invention

The present invention relates to photography and more particularly to an apparatus and method for color negative evaluation for determining which filter combination should be used in producing a final color balance print.

Ideally, a color print could be made by placing it into an enlarger and then simply exposing it to a sheet of photosensitive printing paper. Unfortunately, such a simple process almost always produces a print which has a color imbalance; for example, the print may have too much blue, or green, or an overall tint or cast of some other color. The imbalances are caused by many different factors and the characteristics of any two color negatives will rarely be the same. One source of the imbalance is in the printing paper itself and this will depend on normal manufacturing variations from one emulsion coating to another, adverse conditions before exposure, illuminating and exposure time, adverse storage conditions between exposure and processing, non-standard processing conditions, and variations in the response of the emulsions of the paper itself. Additional sources of imbalance include variations in the color temperature and age of the enlarger lamp, variations in the internal reflecting color of the enlarger, and the age or freshness of the processing chemicals.

Therefore, to produce a color balanced print, that is, a print closely reproducing the color of the original subject, it is necessary to use filters which are preferably placed above the negative during the printing process.

Following the rule that a color cast is removed by a filter of the same color, a suitable filter can be found to correct for any unnatural color predominance. For example, a pale yellow filter can be used if the print has a slight yellow cast to it; and if the yellow cast is strong, a deep yellow filter can be used. Similarly, a magenta filter can be used to eliminate magenta tints or casts, and cyan filters can be used to control cyan casts. Yellow, magenta, and cyan are the principal filter colors and these colors can be combined for filtering other colors such as blue, red, or green. For example, a green cast can be removed by a cyan and yellow combination, a blue cast by a combination of magenta and cyan, and a red cast by a combination of magenta and yellow. The cast may be yellowish green indicating that its yellow component is stronger than its cyan component so that the yellow filter in combination must be denser than the cyan.

The method of using a series of graduated filters of each of the three principal yellow, magenta, and cyan colors is referred to as subtractive or white light printing. Because paper is made up of three color responding layers, only one or two series of filters are needed to correct a given negative, usually yellow and magenta.

Filters are graduated in terms of density and in the typical filter designation 20 Y, 20 stands for a density of 0.20 and Y for the color yellow which is the filter color. The yellow filter is actually blue light absorptive, and it is the blue light that gives the yellow cast to a print; therefore, a 20 yellow filter placed in a light beam reduces the blue light exposure by 0.20log exposure units. Filter densities can range from 0, that is, no absorption, and upwards; for example, the designation 40 corresponds to a reduction of 0.40log exposure units.

DESCRIPTION OF THE PRIOR ART

Three general systems of color negative evaluation are in current use: Trial and error, non-electronic instrument evaluation, and electronic instrument evaluation. The trial and error method is somewhat self explanatory and is based on making successive prints each time estimating the filter combination required to remove the color cast of the previous print and in this manner zeroing in on a color balanced print which conforms to a real or imaginary standard. The procedure can result in many tedious dark room hours with uncertain results and consumes a large quantity of expensive printing paper; even the most skilled person may have to make five or more prints before obtaining satisfactory results. The present invention overcomes these problems in the trial and error method by providing an apparatus and method for evaluating color negatives both accurately and in a minimum number of steps. In fact, in controlled situations the method of the present invention will often require only one print.

Of the existing non-electronic type evaluation systems, possibly the simplest is to first make a print using a suggested filter combination, for example 20 M plus 20 Y. This print is then processed and viewed through different colored filters and the color correction needed estimated. However, it has been found that this system usually requires numerous printings to achieve an acceptable final color balanced print.

Another non-electronic system uses a mosaic of yellow and magenta filters of increasing density running in two different directions. To use this system, the operator places the negative in the enlarger, the mosaic on the paper positioned beneath the enlarger, and then beneath the lens he places a scrambler which mixes the light coming out of the enlarging lens. This light is then in turn projected through the mosaic onto the paper. The resulting print will show dots or squares of various hues and colors and the correct filter is chosen by locating the dot which is nearest in color to a neutral grey.

However, there are several problems with this system. Not all scenes can be integrated into a neutral grey such as, for example, portrait pictures with various backgrounds. It has been found that some types of scenes will integrate into a truly neutral grey thereby giving a satisfactory color balanced print. To achieve best results, a photographer using this system should include a reference grey card with the negative, however, even using this technique, it has been found that further prints are required. Other variations of this technique are possible, but none lead to a well balanced color print for all subjects in a minimum number of steps.

Electronic systems are available which use integration schemes similar to the scheme described above with respect to the non-electronic analyzer. Using these electronic systems, the whole negative may be analyzed (integrated) or, alternatively, small areas may be separately analyzed (spot analysis). Integration has all the faults of the non-electronic systems previously discussed. It is believed that the spot analysis method achieves better results, however, there is a problem of deciding what part of the negative to analyze according to a particular standard. The flesh tones are usually used as a point of departure. The problem with this is that not everyone has the same color flesh and, if one were to analyze every negative to the same standard, every print made would have the same color cast to the flesh.

Based on national statistics the average professional color finishing laboratory using the above electronic methods uses two and one half sheets of paper per negative. In many instances, the present invention will reduce this consumption of paper, and because the present invention is comparatively much less expensive, it would be widely available to the less affluent amateur photographers.

Another system of electronic color analysis is the Kodak Video Color Analyzer. This system, however, is priced in the neighborhood of $26,000 and requires a trained operator thereby putting it out of the reach of all but the most sophisticated laboratories. In addition, the Kodak system claims only 75% acceptance rate on the first print.

The present invention has overcome the problem of the expense involved in the electronic systems, and generally increases the efficiency of color negative evaluation whereby it is possible to obtain a good color balanced final print in a minimum number of steps thereby using a minimum amount of paper.

SUMMARY OF THE INVENTION

The present invention is an apparatus and method for color negative evaluation. The apparatus is comprised of a filter matrix board having a plurality of different gradation filter elements disposed therein and means for compensating for transparency differentials between filter elements. A lens matrix board is provided and is arranged for positioning an individual lens with respect to each of the filter elements in the filter matrix board. A frame supports the lens matrix board and the filter matrix board complimentary to one another between a photo enlarger which has its lens removed and a sheet of photosensitive paper such that the image on the color negative held in the photo enlarger can be projected through the lens and filter matrices and focused onto the photosensitive paper to produce a plurality of images thereon. Each of the plurality of images has a slightly different coloration from all of the others depending on the combination of filter elements disposed in the filter element matrix board.

The method of the present invention is comprised of the steps of exposing a color negative to photosensitive paper concurrently through a plurality of filter elements having different filter gradations equalized to correct for transparency differentials and corresponding lenses to reproduce as many prints on the paper as there are filter combinations, and developing the photsensitive paper to provide a matrix of uniformly exposed, different colored prints of the same negative, the color tones of which are determined by the particular filter combination associated with each print. The matrix of color prints can then be visually evaluated to determine which filter combination in the filter matrix produces the print which most accurately reproduces true coloration of the subject or which is visually most pleasing to the eye.

OBJECTS OF THE INVENTION

It is therefore an important object of the present invention to provide an apparatus and method for color negative evaluation which utilizes a set of filter matrix boards through which a color negative can be projected for producing a matrix of different colored prints on a single sheet of printing paper.

It is another object of the present invention to provide an inexpensive apparatus and method for color negative evaluation which can be used in conjunction with a standard photo enlarger.

It is a further object of the present invention to provide an apparatus and method for color negative evaluation which utilizes a lens matrix board together with a filter matrix board whereby an individual lens is provided for each individual filter element in the filter matrix board.

It is still another object of the present invention to provide an apparatus and method for color negative evaluation which can be employed to determine the filter combination which yields the best color balance print in the minimum number of successive printings.

It is still a further object of the present invention to provide an apparatus and method for color negative evaluation which allows the photographer to analyze a color negative to determine the filter combination which produces the print which is aesthetically the most pleasing to the photographers eye.

And it is still another object of the present invention to provide an apparatus for color negative evaluation which is easy to operate and readily manipulated in a dark room.

DESCRIPTION OF THE DRAWINGS

FIG. 1 is a perspective view of the apparatus of the present invention in conjunction with a photo enlarger showing the filter and lens matrix boards removed from the frame.

FIG. 2 is a side view of the frame shown in FIG. 1 as viewed from line 2—2.

FIG. 3 is a partial cross-sectional view of the frame shown in FIG. 1 taken along line 3—3.

FIG. 4. is a schematic view of a 5 by 5 filter matrix board having yellow and magenta filters.

DESCRIPTION OF THE PREFERRED EMBODIMENT

The following description is to the apparatus and method of the present invention in its preferred form with references made to the accompanying drawings. Described is a novel apparatus and method for evaluating color negatives for determining the filter combination which will produce a final print having the desired color balance. Briefly, a number of different filter combinations are simultaneously used to produce a corresponding number of prints having different colorations depending on the filter combinations utilized and by evaluating these prints for best color balance the proper filter combination is determined for making the final print. If necessary, the color balance can be improved by repeating the above step using filter combinations for finer gradations which are centered around the best filter combination determined from the first step. Using the apparatus and method of the present invention, a minimum number of steps should be required to produce good results, and many times only one step will be required.

Referring now to the drawings, filter matrix board 11 is provided which has a plurality of different filter elements disposed therein. Since yellow, magenta, and cyan are the three principal filter colors used and which can be combined to filter out any undesired color predominance, each element 13 in filter matrix board 11 will contain one or a combination of these filter colors. It has been found that a five by five array containing 25 filter elements is most suitable for projection on a standard 8 × 10 sheet of printing paper. However, other arrays containing greater or fewer elements may be used.

In order to provide for the many filter color and density combinations needed to attack possible color distortion and balance problems, more than one and in fact a multiplicity of filter matrix boards are required; therefor, in the preferred embodiment, a set of interchangeable matrix boards is provided each having 25 elements such as in the filter matrix board 11 shown in FIG. 1. Each board of the set combines two of the three principal colors in different gradations with matrix boards with large color gradation steps between elements being provided for gross analysis, that is to achieve a "ballpark" filter combination, and boards having finer gradations being provided for instances where the approximate color characteristics are known, or for the final stage or stages of zeroing in from an intermediate gross analysis.

Provided in connection with filter matrix board 11, but not shown in the drawings, is a means for controlling the amount of light through each of the filter elements 13 of the filter matrix board. This is required in order to equalize the intensity of the light striking the print paper, and hence the uniformity of exposure among the resulting prints, by compensating for the transparency differentials between filter elements having different filter densities. In the preferred embodiment, apertures having different sizes are adapted to, such as by being fitted over, the respective filter elements. These apertures are preadjusted by the manufacturer according to an arbitrary enlarger f-stop setting (a setting of 5.6 has been found to be convenient). As an alternative to varying the filter element aperture sizes, neutral density filters may be used whereby the amount of light transmitted is regulated by different non-color absorbing filters rather than by aperture size.

Lens matrix board 15 is provided which has an array of lenses 17 which can be positioned with respect to the array of filter elements 13 in any one of the filter matrix boards. The lens matrix board conforms in shape to each of the filter matrix boards such that one can be adapted over the other whereby the individual lenses 17 align themselves with the individual filter elements 13. Preferably, for optimum focusing and to minimize distortion, both the lens and filter matrix boards are arcuate in shape and have a radius generally equal to the distance the matrix boards are disposed below the color negative. Because the above-described matrix of lenses is utilized to individually focus the image from the enlarger on the print paper, the lense of the photo enlarger is removed.

Each filter element 13 within filter matrix board 11 is graduated in color density with respect to adjacent filter elements such that, because of their graduated absorptive characteristics, a color negative projected therethrough produces a matrix of photographs having graduated degrees or steps of color tone. As an example, a filter matrix having different combinations of yellow and magenta filters is shown in FIG. 4. In such a matrix, the yellow filter density can be made to vary between zero and a maximum level along the rows of the matrix by holding the magenta in each row constant, and, in a corresponding manner, the magenta can be made to vary from zero to a maximum level along the columns of the matrix while holding the yellow density constant. In the example, step densities of five from zero to twenty along both the rows and columns are shown thereby producing a matrix having elements of all different combinations of yellow and magenta filter densities. Because this matrix has steps of five along the rows and five along the columns, it is called a 5 by 5 matrix. In this same manner yellow and cyan can be combined as well as cyan and magenta, and grosser and finer matrices can be provided such as, for example, a 40 by 40 matrix in steps of forty, or a 10 by 10 in steps of ten.

Referring to FIG. 1, photo enlarger 19 serves to hold the color negative to be evaluated at a suitable distance from the photosensitive paper; the lens of the photo enlarger is removed for this purpose. Frame 21 supports the lens matrix board 15 and one of the filter matrix boards such as 11, complimentary to one another between the photosensitive paper and the photo enlarger such that the image on the color negative secured in the photo enlarger can be projected through the lens and filter matrices and focused onto the photosensitive paper to produce a plurality of individual images thereon. Each of the plurality of images so produced will have a slightly different coloration from each of the others depending on the combination of filter elements disposed in the filter element matrix board.

In the embodiment, shown in FIG. 1, frame 21 has a base portion 23 for holding the photosensitive paper. Preferably, surface 25 is formed on base 23 for supporting the photosensitive paper and is arcuate in shape having a radius of curvature approximately equal to the distance between the surface 25 and the color negative held in photo enlarger 19. However, this surface may be alternatively flat with only minor noticeable degradation of the focusing of the images, but without affecting the color gradations.

Intermediate support portion 27 of frame 21 is disposed in spaced relation to base portion 23, such as by corner posts 29. Opening 31 is formed centrally of intermediate support portion 27, and this opening has means, such as shoulders 33, for holding the lens and filter matrix boards in complimentary relation to each other within its perimeter. The intermediate support portion 27 is disposed about half way between the photo enlarger 19 and base portion 23 such that the image on the color negative held in the photo enlarger can be projected through filter elements 13 and complimentary lenses 17 onto the photosensitive paper held on surface 25 to produce a plurality of images thereon.

The apparatus of the present invention can be easily constructed in its preferred form and the only additional equipment required is a photo enlarger such as is shown in FIG. 1, and a set of filters adapted to be held in the enlarger. The method of the present invention described below preferably employs the apparatus as described above, but may also employ and apparatus which is compatible with the steps described herein as follows: The color negative to be evaluated is exposed to photosensitive paper through a plurality of filter elements equalized in terms of light passage and corresponding lenses to concurrently reproduce as many prints on the photosensitive paper as there are filter combinations. The photosensitive paper is then developed to provide a matrix of prints of uniform exposure in which each print in the matrix has a different color tone. The variation in coloration is caused by the difference in the filter combination of each filter element associated with the individual prints, and, by visually evaluating the print matrix, the filter combination in the filter matrix which most accurately reproduces the true coloration of the subject or which is visually most pleasing to the eye can be isolated.

It has been found that to obtain optimum results, especially when using a new batch of printing paper, several printings using the method of the present invention may be required. Each batch of printing paper has somewhat different color characteristics which will effect the ultimate choice of filters, therefore, it is advantageous when beginning with a new batch of paper to begin with a gross analysis for zeroing in on the paper. The first step would thus be a gross analysis using, for example, a 40 by 40 matrix board. The optimum filter combination is achieved by repeating the process using matrix boards having finer gradations with the new matrix board being selected in accordance with the results of the more gross analysis. Using this zeroing in method, the optiumum filter combination in most cases can be determined in two or three steps. Once a new batch of paper has been evaluated, subsequent printings will probably require fewer steps, and if the same type of film is used as in previous runs, the negative can normally be analyzed in one printing using a matrix having finer gradations.

The preferred method for evaluating color negatives using a new batch of paper can further be described as follows:

A standard negative is placed in enlarger 19 from which the focusing lens has been removed and the enlarger placed at a distance above the enlarger's base which has been determined by the manufacturer. Assuming the evaluation apparatus is adapted to 35mm negatives and it is desired to analyze a 120mm negative, the edges of the 120mm negative can be simply masked off.

A gross filter matrix board together with the lens matrix board 15 is then placed in opening 31 of the intermediate support portion 27 of frame 21. The exposure time can be easily determined by using a photo light meter to analyze the negative and noting its characteristics for density. In the alternative, a strip of 2 × 8 inch printing paper can be placed on surface 25 of frame 21 below the filter and lens matrices, and then a mask containing step densities can be placed over the paper and the enlarger set for exposure time of 60 seconds. By examining the series of pictures printed on the 2 × 8 inch piece of paper the picture with the best density can be determined thereby given the best exposure time. Other schemes are possible, however, the ones suggested hereinabove have been found to be suitable.

Assuming a new batch of standard 8 × 10 inch printing paper, the next step is to place a piece of paper from the new batch on surface 29 of base 23. After exposing the printing paper to the negative to be evaluated through the gross filter matrix, the print paper is developed to provide a matrix of photographs having different colorations depending on the choice of corresponding filter elements 13. From this matrix of photographs, it will probably not be possible to pick a picture which is exactly right, therefore the best picture is chosen and the filter combination producing that picture noted.

In the next step of the analysis the gross filter matrix is replaced in frame 21 by a filter matrix board having finer gradations between filter elements. Interim filters are then placed in the enlarger's filter holder (not shown), called a filter drawer, with these interim filters being selected according to the gradations in the newly selected filter matrix board. The interim filters provide a point of departure for the next matrix of prints which are produced by exposing the color negative through both the interim filters in the enlarger filter drawer and the filter elements of new filter matrix board; therefore, the interim filters are normally selected by subtracting out that number of steps gradations from the previously best noted filter combination which would place the corresponding best noted print approximately in the center of the new matrix of prints, although the new matrix of prints can be biased in any direction with respect to the best print if so desired. For example, if the previously determined best filter combination is 40M by 40Y and a 10M by 10Y matrix board is to be used in this next step of the analysis, then to achieve a 10M by 10Y pattern of prints around the best picture, 20M and 20Y should be subtracted from 40M and 40Y, respectively, to yield an interim filter combination of 20Y by 20M which is placed in the enlarger. From this new matrix of prints, which starts at 20Y by 20M and in steps of ten are arrayed up to 60Y by 60M, the best print is again selected and again the filter combination producing the best print noted. If required, this procedure can be repeated using yet a finer gradation matrix board to produce finer adjustments between adjacent pictures in the matrix.

If the approximate filter combination required is known from the outset and a gross analysis is therefore not required, the first step of the analysis would be to select suitable interim filters for placement in the filter drawer of the enlarger and a matrix board having suitably fine gradations. Once the correct filter combination is determined, that combination is selected from the usual set of filters and used to make the enlargement. The proper f-stop of the enlarger lens for that filtering can easily be determined from available tables.

It should be pointed out that by using the method of the present invention, not only the best picture for facial color can be selected, but also the picture can be chosen which produces the best background or other important colors. This cannot be done by any other system except Kodak visual analyzer which as has been pointed out is very expensive and beyond the financial resources of most all amateurs and even a majority of professional photographers.

The apparatus and method of the present invention provides a novel means for efficiently evaluating color negatives to determine the filter combination which will produce a final color balanced print. This is achieved at a savings in the cost of print paper and at a low front end equipment cost. The invention also allows the photographer to tailor his color prints to his particular aesthetic tastes which in many instances may stray or deviate somewhat from true color reproductions. In this manner, the factors which effect color balance, such as film and printing paper characteristics, can be compensated for. This method can also be used for compensating for any color cast in the enlarger lens, if such a compensation is required, by comparing the final print with the final matrix of prints produced using the abovedescribed method. If any deviation occurs, a lens factor can be incorporated in the final filter package.

Besides color analysis, the apparatus and method of the present invention might also be useful for determining the exposure level and contrast desired when printing black and white on variable contrast paper such as Kodak polycontrast or DuPont Varalure. This may be done by making a matrix board containing various polycontrast filters and step wise neutral density filters.

A further use would be to simultaneously produce a number of wallet sized photos.

Although the present apparatus and method have been described in considerable detail above, it is not intended that either the apparatus or method be limited to such detail, except as is necessitated by the appended claims.

I claim:

1. An apparatus for color negative evaluation for use with a photo enlarger comprising
   a set of interchangeable filter matrix boards, each board having a plurality of different gradation filter elements disposed therein and means for compensating for transparency differentials between filter elements,
   a lens matrix board arranged for positioning an individual lens with respect to each of the filter elements in any one of said filter matrix boards, and
   a frame for supporting said lens matrix board and a filter matrix board preselected from said set of interchangeable filter matrix boards complimentary to one another between the photo enlarger and a sheet of photosensitive paper such that the image on a color negative held in the photo enlarger can be projected through said lens matrix and said preselected filter matrix and focused onto said photosensitive paper to produce a plurality of images thereon whereby each of said plurality of images has a different coloration from each of the others depending on the combination and gradation of filter elements disposed in the filter matrix board selected.

2. The apparatus of claim 1 wherein said frame comprises
   a base portion having a surface for holding said photosensitive paper, and
   an intermediate support portion disposed in spaced relation to said base portion, said intermediate support portion having an opening formed centrally thereof and means for holding said lens and filter element matrix boards in complimentary relation to each other.

3. The apparatus of claim 2 wherein said means for compensating for transparency differentials between filter elements includes different sized apertures adapted to each of said filter elements in said filter matrix board whereby filter elements having low density filters have smaller apertures than filter elements having high density filters which without such compensation pass less light.

4. An apparatus for color negative evaluation for use with a photo enlarger comprising,
   a set of interchangeable filter element matrix boards, each board having a plurality of different sized apertures adapted to each of filter elements for compensating for transparency differentials therebetween,
   a lens matrix board conforming in shape to said filter matrix boards and holding a plurality of lenses in complimentary relationship to the filter elements of any one of said filter matrix boards when said filter and lens matrix boards are placed in aligned relation,
   a rigid frame comprising
   a base portion having a surface for holding photosensitive paper, and
   an intermediate support portion spaced from said base portion about midway between said photo enlarger and said base portion, said support portion having an opening formed centrally thereof and means for supporting said lens matrix and a matrix board preselected from said set of interchangeable matrix boards complimentary to each other such that the image on a color negative held in the photo enlarger can be projected through said lens matrix and preselected filter matrix and focused onto said photosensitive paper to produce a plurality of images thereon whereby each of said plurality of images has a slightly different coloration depending on the combination and gradation of filter elements disposed in the filter matrix board selected.

5. The apparatus of claim 4 wherein said lens matrix board and said filter matrix board are arcuate and have a radius generally equal to the distance the upper support portion of the frame is disposed below the photo enlarger for operation.

6. The apparatus of claim 5 wherein said surface for supporting said photosensitive paper is arcuate and has a radius of curvature approximately equal to the distance between said surface and the color negative disposed in said photo enlarger.

7. A method for color negative evaluation for choosing a suitable filter combination for the final color print comprising,
   removing the focusing lens from a standard type photo enlarger,
   exposing said color negative to photosensitive paper concurrently through a filter matrix board preselected from a set of filter matrix boards and a lens matrix board wherein the filter elements of said filter matrix board have different filter combinations and gradations depending on the matrix board selected and are equalized to correct for transparency differentials, and the lenses of said lens matrix board are arranged complimentary to said filter elements,
   developing said photosensitive paper to provide a matrix of different color prints of the same negative, the color tones of each print of said matrix of prints being determined by the particular filter combination associated therewith whereby said matrix of color prints can be visually evaluated to determine which filter combination of said matrix of filter elements produces the print which most accurately reproduces the true coloration of the subject or which is visually the most pleasing to the eye, and
   repeating the aforementioned steps of exposing and developing the photosensitive paper, as required to obtain a desired color reproduction, using a new filter matrix board of finer gradation selected from said set of matrix boards, said newly selected matrix board to be determined in accordance with the filter combination of the element of said matrix board giving the best overall print coloration from the previous exposure.

* * * * *